:::page

(12) United States Patent
Sickinger et al.

(10) Patent No.: US 9,482,745 B2
(45) Date of Patent: *Nov. 1, 2016

(54) DRIVER ASSISTANCE DEVICE FOR A VEHICLE AND METHOD FOR OPERATING A RADAR DEVICE

(75) Inventors: Frank Sickinger, Weissach (DE); Stefan Olejniczak, Zürich (CH)

(73) Assignee: VALEO Schalter und Sensoren GmbH, Bietigheim-Bissingen (DE)

(*) Notice: Subject to any disclaimer, the term of this patent is extended or adjusted under 35 U.S.C. 154(b) by 503 days.

This patent is subject to a terminal disclaimer.

(21) Appl. No.: 14/001,728

(22) PCT Filed: Feb. 8, 2012

(86) PCT No.: PCT/EP2012/052082
§ 371 (c)(1),
(2), (4) Date: Mar. 4, 2014

(87) PCT Pub. No.: WO2012/116876
PCT Pub. Date: Sep. 7, 2012

(65) Prior Publication Data
US 2014/0168006 A1    Jun. 19, 2014

(30) Foreign Application Priority Data

Mar. 3, 2011 (DE) ......................... 10 2011 012 843

(51) Int. Cl.
*G01S 7/40* (2006.01)
*G01S 13/93* (2006.01)

(52) U.S. Cl.
CPC ............. *G01S 7/4021* (2013.01); *G01S 7/40* (2013.01); *G01S 13/931* (2013.01);
(Continued)

(58) Field of Classification Search
CPC .................................................. G01S 7/4021
See application file for complete search history.

(56) References Cited

U.S. PATENT DOCUMENTS 3,243,815 A * 3/1966 Dynan ................. G01S 7/4021
342/174

3,883,870 A   5/1975 Kunz
(Continued)

FOREIGN PATENT DOCUMENTS

JP    2000-151472 A    5/2000
JP    2004-506909 A    3/2004
(Continued)

OTHER PUBLICATIONS

Office Action in corresponding Japanese Patent Application No. 2013-555814 mailed Jun. 19, 2015, with translation (10 pages).
(Continued)

*Primary Examiner* — Matthew M Barker
(74) *Attorney, Agent, or Firm* — Osha Liang LLP (57) ABSTRACT

The invention relates to a driver assistance device (2) for a vehicle (1), which driver assistance device has a radar appliance (3, 4) for determining measured variable ($\alpha_1$, $\alpha_2$, $R_1$, $R_2$) referenced to an object (10) that is external to the vehicle, wherein the radar appliance (3, 4) comprises: at least a first and a second reception antenna (14, 15), each for receiving signals ($S_{E1}$, $S_{E2}$); a first down-converter (17), which is coupled to the first reception antenna (14) via a first reception path (16), and a second down-converter (23), which is coupled to the second reception antenna (15) via a second reception path (21), for down-converting the received signals ($S_{E1}$, $S_{E2}$) into respective baseband signals ($S_{B1}$, $S_{B2}$); a control device (5) for determining the measured variable ($\alpha_1$, $\alpha_2$, $R_1$, $R_2$) using the baseband signals ($S_{B1}$, $S_{B2}$); and test means (32) for producing a local check signal ($S_P$) and for coupling the check signal ($S_P$) into the first reception path (16) and into the second reception path (21), as a result of which the control device (5) receives the check signal ($S_P$) that has been down-converted by the first down-converter (17) as a first test signal ($S_{T1}$) and the check signal ($S_P$) that has been down-converted by the second down-converter (23) as a second test signal ($S_{T2}$). The control device (5) uses the test signals ($S_{T1}$, $S_{T2}$) to determine a frequency-dependent correction variable ($\delta_{(F)}$) for correcting the measured variable ($\alpha$, $\alpha_2$, $R_1$, $R_2$). The invention also relates to an appropriate method.

13 Claims, 5 Drawing Sheets

(52) U.S. Cl.
CPC ............ *G01S 2013/9314* (2013.01); *G01S 2013/9321* (2013.01); *G01S 2013/9332* (2013.01); *G01S 2013/9378* (2013.01)

(56) References Cited

U.S. PATENT DOCUMENTS

| | | | |
|---|---|---|---|
| 4,368,468 A | 1/1983 | Lisle et al. | |
| 4,984,293 A * | 1/1991 | Cummings | H04B 17/20 455/133 |
| 2003/0160718 A1 * | 8/2003 | Nagasaku | G01S 7/032 342/174 |

FOREIGN PATENT DOCUMENTS

| | | |
|---|---|---|
| JP | 2004/251837 A | 9/2004 |
| JP | 2005-286928 A | 10/2005 |
| JP | 2009-294071 A | 12/2009 |
| WO | 2011/001206 A1 | 1/2011 |

OTHER PUBLICATIONS

Office Action for corresponding German Application No. 10 2011 012 843.3, mailed Jun. 22, 2011 (5 pages).

International Search Report for corresponding International Application No. PCT/EP2012/052082, mailed Jun. 20, 2012 (4 pages).

* cited by examiner

Driver Assistance Device for a Vehicle and Method for Operating a Radar Device

The invention relates to a driver assistance device for a vehicle, which driver assistance device has a radar appliance for determining at least one measured variable referenced to an object that is external to the vehicle. The radar appliance comprises at least a first and a second reception antenna, each for receiving signals. Furthermore, it also comprises a first and a second down-converter: the first down-converter is coupled to the first reception antenna via a first reception path, and the second down-converter is coupled to the second reception antenna via a second reception path. The down-converters are used to down-convert the received signals into respective baseband signals. The radar appliance also contains a control device for receiving the baseband signals and for determining the at least one measured variable using the baseband signals. Test means are provided for producing a local check signal and for coupling the check signal into the first reception path, on the one hand, and into the second reception path, on the other hand. The control device therefore receives the check signal down-converted by the first down-converter as a first test signal, on the one hand, and the check signal down-converted by the second down-converter as a second test signal, on the other hand. The control device then uses the test signals to determine a correction variable for correcting the measured variable. The invention also relates to a vehicle having such a driver assistance device and to a method for operating a radar appliance in a motor vehicle.

In the present case, the interest is in calibrating as well as checking the operational status of a radar appliance in a motor vehicle, namely particularly of a radar appliance which is used to determine a target angle for an object. The target angle is an angle between a connecting line that connects the radar appliance and the object that is external to the vehicle and a reference line which runs through the radar appliance. The interest is directed particularly at phase monopulse measurement. This method is used to determine the target angle and is a known method in radar engineering. Determination of the target angle, and also possibly further measured variables, requires at least two reception antennas, which may be two individual antennas or else two reception antenna groups (arrays). The signals received by the reception antennas are conditioned in two separate reception channels or reception paths and processes digital signals using a control device. The target angle—and possibly further measured variables—is determined on the basis of the phase shift between the received signals.

A radar appliance thus requires two reception channels in order to ascertain the measured variables with a high level of precision. A reception channel or reception path contains a reception antenna and a down-converter (reception mixer). The down-converter is usually coupled to a baseband amplifier which is used to amplify the baseband signal. However, the phase of the down-converted signals is determined not solely by the propagation path and the propagation properties in the air, that is to say not solely by the position of the object relative to the radar appliance, but is additionally highly dependent on the operating temperature, and also on the deviations in the production parameters of the components of the radar appliance, namely particularly of the down-converters and of the baseband amplifiers, and on the integration thereof into the housing of the radar appliance. The following problem therefore exists: the first reception path, including the first down-converter and also the baseband amplifier, can cause a different shift in the phase of the received signal than the second reception path, including the second down-converter and the second baseband amplifier. When determining the measured variables, however, it is assumed that the respective phase shifts by the first and second reception paths are the same. If these shifts in the phase are different, it is not possible to achieve maximum-precision determination of the measured variables—particularly of the target angle.

A remedy is provided here by radar systems in which test means are provided that produce a local, radio-frequency check signal and couple this signal into the two reception channels. This check signal is then down-converted by the respective down-converters, namely to the baseband. The check signal down-converted in the first reception channel is then received as a first test signal by the control device, while the check signal down-converted in the second reception channel is available as a second test signal. The control device can then determine the phase difference between the phases of the two test signals and can use this phase difference as a correction variable for correcting the target angle. In the subject matter according to the document US 2003/0160718 A1, a transmission signal emitted by the radar appliance is used as a check signal in this case, which is coupled into the two reception channels as a known signal. The transmission signal is tapped off from a transmission path or transmission channel and is routed to the reception channels via a switch.

It this furthermore prior art to provide a check signal that is separate from or independent of the transmission signal and to couple it into the respective reception channels. In comparison with the use of the transmission signal as a check signal, this approach has the advantage that the correction variable can be ascertained, and the radar appliance can be calibrated, even when the radar appliance is not emitting a transmission signal.

It is an object of the invention to demonstrate a way in which the driver assistance device of the type in question mentioned at the outset can be developed further such that it is possible to determine the at least one measured variable even more precisely for a wide variety of relative speeds of the vehicle-external object in relation to the vehicle.

The invention achieves this object by means of a driver assistance device having the features according to patent claim 1, and also by a vehicle according to patent claim 14 and by a method having the features of patent claim 15. Advantageous embodiments of the invention are the subject matter of the dependent patent claims and of the description.

A radar appliance in a driver assistance device according to the invention is used for determining at least one measured variable referenced to an object that is external to the vehicle. It comprises at least a first and a second reception antenna (single antenna or a group of antennas or an array), each for receiving signals, i.e. electromagnetic waves. The first reception antenna has a first down-converter coupled to it, namely via a first reception path; the second reception antenna has a second down-converter coupled to it, namely via a second reception path. The down-converters are used to down-convert the received signals into respective baseband signals. A control device receives the baseband signals and determines the at least one measured variable using the baseband signals. The radar appliance has test means which are designed to produce a local check signal and also to couple the same check signal firstly into the first reception path and secondly into the second reception path. The control device receives firstly the check signal that has been down-converted by the first down-converter as a first test signal and secondly the check signal that has been down-converted by the second down-converter as a second test signal. The control device can use the test signals to determine a correction variable for correcting the measured variable. According to the invention, it is provided that the control device uses the test signals to determine the correction variable as a frequency-dependent variable.

In other words, a core concept of the invention involves the use of the two test signals to determine a correction variable that is dependent on the frequency in the baseband and that can be used to correct the measured variable—that is to say the target angle, for example. It is therefore more or less possible to perform frequency-dependent calibration of the phase difference between the phases of the received signals. The invention is based on the insight that besides the two down-converters the respective baseband amplifiers coupled to the down-converters also cause a fluctuation in the phase difference that is frequency-dependent over the entire baseband, and hence frequency-dependent fluctuations in the phase difference between the phases of the received signals can also be expected. On account of the two baseband amplifiers and the converters, the difference between the phases of the received signals is therefore subjected to frequency-dependent fluctuations that are caused by the unequal fluctuations in the phase properties of the two baseband amplifiers and the converters. The invention now takes the path of determining the correction variable—that is to say particularly the phase difference between the phase shift in the first reception channel and that in the second reception channel—for a multiplicity of frequency points of the baseband, as a result of which it is possible for frequency-dependent calibration to be performed. Regardless of the frequency of the received signals and hence regardless of the respective current relative speed of the object in relation to the motor vehicle (Doppler effect), it is therefore possible to determine the at least one measured variable with maximum precision.

The invention is also based on the insight that the fluctuations in the phase that are caused by the baseband amplifiers can, in principle, be attributed to the baseband amplifiers usually having a gain characteristic that rises by approximately 20 dB per frequency decade. On the one hand, this is advantageous because it compensates for the decreasing level of the received signal as the distance of the object from the motor vehicle increases. On the other hand, the phase properties of the radar receiver are therefore altered over the entire baseband, which means that frequency-dependent correction of the phase difference proves inadequate. The approach according to the invention provides a remedy in this case by determining the correction variable as a variable that is dependent on the frequency in the baseband.

The check signal provided by the test means is preferably a signal that is separate from or independent of a transmission signal emitted by the radar appliance. Unlike in the subject matter according to the document US 2003/0160718 A1, the correction variable can therefore be determined, and the radar appliance can be calibrated, even when no transmission signal is emitted for measuring the measured variable.

Preferably, the correction variable is a phase difference between a phase of the first test signal and a phase of the second test signal. For a large number of different frequency points in the baseband, it is therefore possible to determine the phase difference between the reception paths, including the respective down-converters and the respective baseband amplifiers. Such measured variables as are ascertained on the basis of the respective phase information from the received signals are therefore successfully determined with maximum precision. Specifically, it is therefore possible to determine, by way of example, a target angle with maximum precision, for example using the phase monopulse method.

Thus, the measured variable may be a target angle. This is defined as follows: an angle between a reference line running through the radar appliance and a connecting line that runs through the radar appliance and the object.

In principle, the frequency-dependent correction variable can be determined in the manner in which the fundamental frequency of the check signal and hence of the test signals is varied over the baseband and thus the correction variable is ascertained for a wide variety of frequency values. However, the filter characteristic would then always need to be taken into account for the signal level. It is therefore found to be particularly advantageous if, in order to determine the frequency-dependent correction variable, the test signals are evaluated—at constant fundamental frequency—for integer multiples of the fundamental frequency of the test signals. In other words, in order to determine the frequency-dependent correction variable, the harmonics of the test signals are evaluated. In particular, this involves determining the phase difference between the phases of the test signals for a plurality of frequency points that correspond to the various integer multiples of the fundamental frequency. This "multiple tone method" allows correction values for correcting the measured variable to be ascertained within the entire baseband or the entire frequency range of the radar application without bringing about any overdriving of the receiver on account of the rise in the gain characteristic of the baseband amplifiers. By evaluating the harmonic signals, it is thus possible to calibrate phase inequalities between the gain characteristics of the two reception paths at the harmonic frequency points.

As a particular preference, the check signal has been subjected to single sideband modulation. Numerous measurements have shown that such single sideband modulation of the the check signal allows the whole phase error of the two reception paths, including the down-converters and the baseband amplifiers, to be detected with a very high level of precision. By contrast, conventional dual sideband modulation does not allow this, or allows it only with increased complexity; this is because a simple dual sideband up-converter does not allow the detection of any phase error at all in principle. Single sideband modulation accordingly caters for maximum precision determination of the phase difference between the two test signals and hence also the measured variables from the radar appliance. In this embodiment, it is possible, by way of example, for a single sideband up-converter to be provided that produces the local check signal. To this end, the up-converter can receive a first pilot signal—at a predefined frequency—and also a second pilot signal, which has a 90° phase shift in relation to the first pilot signal, from the control device. The up-converter is then able to produce the single sideband modulated check signal from the first and second pilot signals.

The control device is thus able to output to the test means—particularly to the up-converter—a first pilot signal and also a second pilot signal, which has a 90° phase shift in relation to the first pilot signal, from which pilot signals the check signal is produced. This allows the provision of the single sideband modulated check signal.

In respect of the evaluation of the harmonics of the test signals, it is found to be particularly advantageous if the two pilot signals from which the check signal is produced are square-wave signals. Specifically then, the local check signal has a multiplicity of harmonics that can then be evaluated after down-conversion to the baseband. By using a square-wave signal, it is therefore possible to determine the correction variable for a multiplicity of frequency points, and the measured variable can be corrected on a frequency basis more or less over the entire baseband.

As already stated, the radar appliance may comprise a first baseband amplifier that is coupled to the first down-converter and a second baseband amplifier that is coupled to the second down-converter, said baseband amplifiers being designed to amplify the baseband signals. In this embodiment, the baseband amplifiers may have a frequency-dependent gain characteristic that increases by a gradient factor per frequency decade that is in a range of values from 17 dB to 23 dB. The gradient factor may be 20 dB, for example. Such a gain characteristic can be used to compensate for the decreasing level of the received signal as the distance of the object from the motor vehicle increases; on the other hand, precisely such a gain characteristic requires the frequency-dependent correction variable to be determined.

The test means may have an up-converter—particularly a single sideband up-converter—for producing the local test signal, the output of said up-converter being coupled firstly to the first reception path and secondly to the second reception path. An output of the up-converter may be coupled firstly to the first reception path and secondly to the second reception path. The local check signal can be coupled into each reception path using a directional coupler, for example. The two directional couplers are then preferably of the same design, which means that the resultant coupling of the check signal into the two reception paths is symmetrical. The use of an up-converter allows a pilot signal produced by the control device at a predefined frequency to be up-converted to an operating frequency for the respective reception paths or for the radar appliance, as a result of which a check on the reception paths at the operating frequency of the radar appliance is possible. The down-converters can then down-convert the check signal back to baseband, namely into the respective test signals.

With regard to a compact, reduced-component and installation-space-saving radar appliance, it is found to be particularly advantageous if same radar appliance has a local oscillator which is shared firstly by the first and second down-converters and secondly by the up-converter and which is used to provide an oscillator signal. The up-converter can therefore be fed the oscillator signal from a local oscillator which is present in the radar appliance anyway. The radar appliance therefore does not require an additional oscillator; the use of an additional component with the associated drawbacks regarding installation space, weight and costs is unnecessary. Moreover, a phase error and a frequency error are therefore precluded on account of various oscillators.

The local oscillator is preferably coupled to an input of the up-converter via a directional coupler or a power splitter or a similar component. Preferably, just a small portion of the power from the oscillator signal is tapped off for the up-converter. Specifically, the directional coupler or the power splitter can tap off a portion from a range of values from −25 dB to −15 dB from the power of the oscillator signal for the up-converter. By way of example, it is utterly possible to tap off a power in a range of values from −25 dBm to −15 dBm for the up-converter. By feeding the up-converter a low-power oscillator signal of this kind, there is no need to use an additional amplifier for that portion of the oscillator signal which is used for feeding the down-converters. There is also no additional amplifier required for the oscillator signal of the up-converter. Although the up-converter is fed with a relatively low-level oscillator signal, the power in the pilot signal from which the up-converter produces the local check signal may be correspondingly higher, which means that the diodes in the up-converter are turned on.

In one embodiment, the control device uses firstly the first test signal and/or secondly the second test signal to check the first and/or the second reception path for operational status. It is therefore possible to check the ready-to-receive status of the respective functional paths, and the control device can recognize any operating error or any faulty reception path, and can also output an appropriate error message. Such an error message may explicitly flag the erroneous reception path and/or the entire radar appliance, so that an engineer is explicitly informed about which radar appliance or which reception path is actually faulty. The engineer then does not need to check all of the radar appliances which are present in the vehicle separately. Thus, the check on the respective reception paths may involve the check signal being produced and the control device checking the presence of the respective test signals. The control device thus checks whether or not the respective test signals are present.

As already explained, the control device can use the local check signal to determine the correction variable for correcting the measured variable and also, if appropriate, to check the reception paths for their respective operational status. Such calibration and also, in particular, the cited check on the manner of operation can take place in the radar appliance in a test mode. This test mode is preferably a separate mode from a normal mode or operating mode in which the radar appliance emits transmission signals and processes the received signals. In the test mode, the radar appliance therefore preferably emits no transmission signals. In one implementation of this embodiment, it is possible to perform a method of this kind, for example: in the test mode, the radar appliance produces the local check signal and couples it into the two reception paths. During the period in which the check signal is provided, the radar appliance sends no transmission signals, which means that in principle no signals can be received by the reception antennas either. The check signal is down-converted, namely to baseband, both by the first down-converter and by the second down-converter; the first down-converter outputs a first test signal to the control device, and the second down-converter outputs a second test signal to the control device. The control device calculates a difference between the phases of the first and second test signals. This difference in the phase is stored by the control device, namely for later correction of a measured variable, for example the target angle. Such a test mode may last for a very short period. By way of example, the period of such a test mode may be in a range of values from 100 μs to 1 ms. Once the difference in the phase and/or another correction variable has been determined by the control device, the test mode can be terminated, and the radar appliance changes to an operating mode. In such an operating mode, the radar appliance can send a predetermined number of frequency-modulated signal pulses (also known by the term "chirps"). The first and second reception antennas then each receive a received signal, which is the transmission signal reflected by an object. The down-converters down-convert the received signals and provide respective baseband signals for the control device. From the baseband signals, the control device determines the measured variable—for example the target angle—initially independently of the phase difference determined in the test mode. The measured variable determined in this manner is subsequently corrected using the phase difference. The radar appliance can change to the test mode before each operating mode or each measurement cycle, in which a respective predetermined number of frequency-modulated signal pulses is sent by the radar appliance. The determination of the correction variable before each measurement cycle ensures that the measured variable can be determined with utmost precision after each measurement cycle.

Instead of producing the local check signal only in a test mode of the radar appliance, same check signal can also be produced constantly by the control device, namely during the operation of the radar appliance. In that case, a frequency component—known to the control device—is obtained continually in the respective baseband signals. Since this frequency—and, more precisely, a plurality of frequency components—is known, it can then be rejected by the control device, for instance with the aid of a notch filter.

The radar appliance is preferably a continuous wave radar which is designed to emit a frequency-modulated continuous electromagnetic wave (also known by the term FMCW (Frequency Modulated Continuous Wave) radar). Such a radar appliance can be successfully used to determine the range of an object from same radar appliance, and also the relative speed of the object in relation to the radar appliance and also the target angle. A receiver in the radar appliance may also comprise—apart from the two down-converters—a low-pass filter, an amplifier and an analog/digital converter for each reception path. The signals received by the first and second reception antennas are then down-converted to baseband, low-pass filtered and subjected to analog/digital conversion in the receiver.

The radar appliance preferably involves the use of a separate transmission antenna—be it an individual transmission antenna or a group of transmission antennas—which is fed by means of a local oscillator in order to produce a transmission signal. The transmission antenna can be phase-controlled so as to be able to capture a relatively wide surrounding region all in all with a narrow main lobe for the directional characteristic in the horizontal direction.

A wide variety of applications for the driver assistance device in the motor vehicle are reasonably possible: by way of example, the driver assistance device can be used for lane change assistance, for monitoring blind spots and for the early recognition of accidents. Alternatively, the driver assistance device may have the function of an automatic distance warning system, an adaptive cruise control system, a lane departure warning system and/or a parking assistant.

A vehicle according to the invention, particularly a motor vehicle, comprises a driver assistance device according to the invention or a preferred refinement thereof.

In the case of a method according to the invention for operating a radar appliance in a vehicle, same radar appliance determines at least one measured variable referenced to an object that is external to the vehicle. Signals are received by at least a first and a second reception antenna. The received signals are down-converted into respective baseband signals firstly by a first down-converter, which is coupled to the first reception antenna via a first reception path, and also secondly by a second down-converter, which is coupled to the second reception antenna via a second reception path. A control device receives the baseband signals and determines the at least one measured variable from the baseband signals. A local check signal is produced in the radar appliance and is coupled into the first reception path and also into the second reception path. The control device receives firstly the check signal that has been down-converted by the first down-converter as a first test signal and also secondly the check signal that has been down-converted by the second down-converter as a second test signal. The control device uses the test signals to determine a frequency-dependent correction variable for correcting the measured variable.

The preferred embodiments presented with reference to the driver assistance device according to the invention, and the advantages of said embodiments, apply in corresponding fashion to the vehicle according to the invention and to the method according to the invention.

Further features of the invention are evident from the claims, the figures and the description of the figures. All features and feature combinations cited above in the description and also the features and feature combinations that are cited below in the description of the figures and/or that are shown in the figures alone can be used not only in the respectively indicated combination but also in other combinations or else on their own.

The invention will now be explained in more detail using a single preferred exemplary embodiment and with reference to the appended drawings, in which.

In the figures, elements which are the same and have the same function are provided with the same reference symbols.

Figure 1:
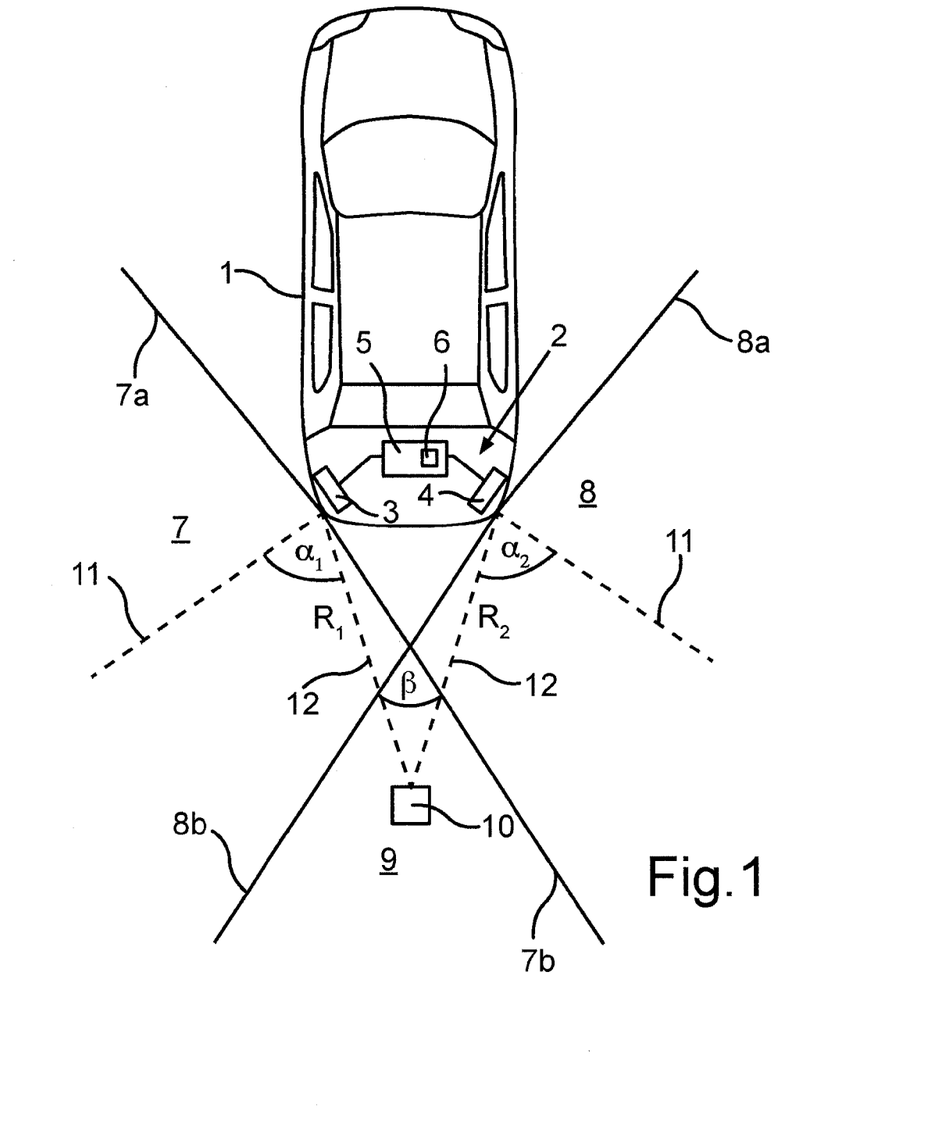
FIG. 1 shows a schematic illustration of a plan view of a motor vehicle with a driver assistance device according to an embodiment of the invention.

A motor vehicle 1, as shown in FIG. 1, comprises a driver assistance device 2 which assists the driver in driving the motor vehicle 1. In the exemplary embodiment, the motor vehicle 1 is an automobile. The driver assistance device 2 may be a monitoring system for blind spots and/or an accident early recognition system and/or an ACC (Adaptive Cruise Control) System.

The driver assistance device 2 comprises a first radar appliance 3 and also a second radar appliance 4. The first radar appliance 3 is arranged in a left-hand corner of a rear bumper and the second radar appliance 4 is arranged in a right-hand corner of the same bumper. The first and second radar appliances 3, 4 are frequency-modulated continuous wave radar appliances (FMCW radar). The radar appliances 3, 4 also include a control device 5, which may comprise a microcontroller 6 that is shared by the first and second radar appliances 3, 4, for example, and also a digital signal processor—not shown in the figures. Alternatively, two separate microcontrollers 6 and/or two digital signal processors may also be provided which communicate with one another via a communication bus that is present in the motor vehicle 1, for example.

The first radar appliance 3 has a capture region 7 which is bounded by two lines 7a, 7b in FIG. 1. The aperture angle of the capture region 7—that is to say the angle between the lines 7a, 7b—is approximately 170° in the example. Correspondingly, the second radar appliance 4 has a capture region 8 which is bounded by two lines 8a, 8b. The aperture angle of the capture region 8—that is to say the angle between the lines 8a, 8b—is likewise approximately 170° in the exemplary embodiment. The capture regions 7, 8 of the radar appliances 3, 4 intersect, which means that there is an overlap region 9. The overlap region 9 is bounded in angular fashion by the lines 7b, 8b. In the exemplary embodiment, an aperture angle β of the overlap region 9 is approximately 70°.

In their respective capture regions 7, 8, the radar appliances 3, 4 are able to locate an object 10. In particular, the radar appliances 3, 4 can determine a respective range $R_1$, $R_2$, for the object 10 from the respective radar appliance 3, 4, a respective target angle $α_1$, $α_2$ and a relative speed for the object 10 in relation to the motor vehicle 1—these are measured variables for the radar appliances 3, 4. The target angles $α_1$, $α_2$ are angles between a respective reference line 11, which runs through the relevant radar appliance 3, 4, and a connecting line 12, which runs through the object 10 and the respective radar appliance 3, 4.

The radar appliances 3, 4 can measure the respective target angle $α_1$, $α_2$ using the phase monopulse method.

Figure 2:
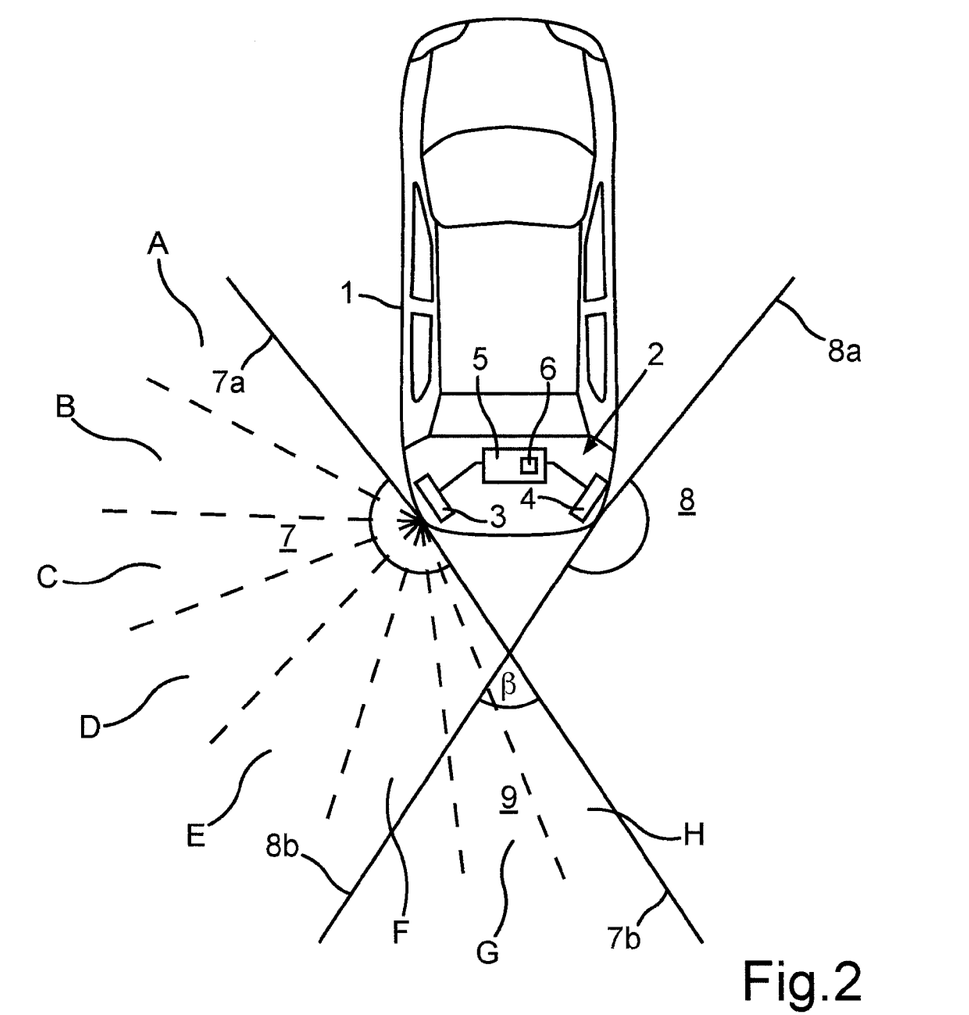
FIG. 2 shows a schematic illustration of a plan view of the motor vehicle shown in FIG. 1, with the capture of various subranges by a radar appliance being explained in more detail.

With reference to FIG. 2, the radar appliance 3—and similarly also the radar appliance 4—can examine various subregions A, B, C, D, E, F, G, H of the capture region 7 in succession. By way of example, this can be done by swiveling a transmission lobe from a transmission antenna electronically in a horizontal direction (azimuth direction), namely using the phase array principle. In this case, at least one reception antenna may have a wide reception characteristic in the horizontal direction, said reception characteristic covering the entire capture region 7. Other refinements may alternatively implement narrow reception angle regions in combination with wide transmission lobes.

For the sake of clarity, FIG. 2 shows only subregions A to H from the capture region 7 of the first radar appliance 3. Correspondingly, the capture region 8 of the radar appliance 4 is in this case also divided into a plurality of subregions which the second radar appliance 4 captures in succession. Although the remainder of the description relates only to the first radar appliance 3, the manner of operation of the second radar appliance 4 corresponds to that of the first radar appliance 3.

In the operating mode or in an individual measurement cycle, subregions A to H are captured in succession by the radar appliance 3. In an individual measurement cycle, the radar appliance 3 separately sends a respective predetermined series of frequency-modulated signal pulses (chirps) for each subregion A to H (that is to say per beam). In the operating mode, subregions A to H are therefore examined at successive times, and objects situated in subregions A to H are detected. Before each measurement cycle or before the initiation of the operating mode—i.e. before each examination of all the subregions A to H—the radar appliance 3 initially changes to a test mode, as explained in more detail below.

Figure 3:
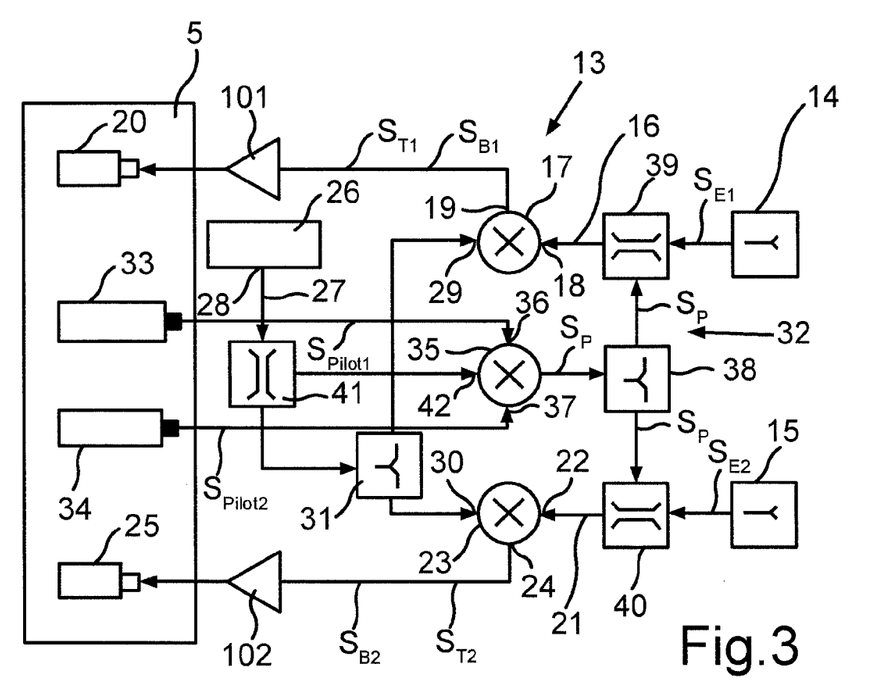
FIG. 3 shows a schematic illustration of a radar appliance in the driver assistance device.

FIG. 3 shows a schematic illustration of the design of a receiver 13 in an individual radar appliance 3, 4. The receiver 13 comprises a first and a second reception antenna 14, 15, which may be individual antennas or a respective group of antennas. The first reception antenna 14 is coupled to a first down-converter 17, namely to the RF (Radio Frequency) input 18 thereof, via a first reception path or reception channel 16. An output 19 of the first down-converter 17 is coupled to the control device 5, specifically to a first channel input 20, via a first baseband amplifier 101. The output 19 of the down-converter 17 may also be coupled to the control device 5 via an analog/digital converter (not shown). Alternatively, such a converter may be integrated in the control device 5.

Correspondingly, the second reception antenna 15 is coupled to an RF input 22 of a second down-converter 23 via a second reception path 21. An output 24 of the second down-converter 23 is coupled to the control device 5, namely to the second channel input 25 thereof, via a second baseband amplifier 102. In this case too, an analog/digital converter may be connected between the control device 5 and the second down-converter 23; alternatively, such a converter may be integrated in the control device 5.

The respective reception paths 16, 21 may each also have a low noise amplifier integrated in them.

A local oscillator 26 provides an oscillator signal or an LO (Local Oscillator) signal 27, namely at an output 28. The oscillator signal 27 is used to feed the down-converters 17, 23 via respective LO inputs 29, 30. To this end, the oscillator signal 27 is split symmetrically using a power splitter 31.

The first and second reception antennas 14, 15 receive signals $S_{E1}$, $S_{E2}$. These are received signals. The signals $S_{E1}$, $S_{E2}$ are the transmission signals reflected by an object. The received signals $S_{E1}$, $S_{E2}$ are down-converted, namely to baseband, by the respective down-converters 17, 23. The respective outputs 19, 24 of the down-converters 17, 23 output baseband signals $S_{B1}$, $S_{B2}$. These baseband signals $S_{B1}$, $S_{B2}$ are then amplified by the two baseband amplifiers 101, 102, subjected to analog/digital conversion by a converter and processed by the control device 5. The control device 5 uses the baseband signals $S_{B1}$, $S_{B2}$ to determine the measured variables mentioned above for the radar appliance 3, 4, namely the range $R_1$, $R_2$, the relative speed, and also the target angle $α_1$, $α_2$.

The angle information from the received signals $S_{E1}$, $S_{E2}$ is ascertained in the control device 5 from a difference between the phases of the baseband signals $S_{B1}$, $S_{B2}$. The output phase of the down-converters 17, 23 and the baseband amplifiers 101, 102 is not determined solely by the signals $S_{E1}$, $S_{E2}$ from the two reception paths 16, 21, however, but rather is additionally also dependent on the operating temperature and also on the fluctuations in the production parameters for the down-converters 17, 23 and also the baseband amplifiers 101, 102 and the integration thereof in a housing.

The target angle $α_1$, $α_2$ is ascertained on the basis of a phase shift between the respective phases of the baseband signals $S_{B1}$, $S_{B2}$.

In order to ensure that the target angle $α_1$, $α_2$, and also the range $R_1$, $R_2$ and the relative speed are determined with utmost precision, the receiver 13 has test means 32. The test means 32 are designed to produce a local check signal $S_P$ and to couple same check signal $S_P$ both into the first and into the second reception path 16, 21 symmetrically. The local check signal $S_P$ has been subject to the single-sideband modulation.

A first pilot output 33 of the control device 5 produces a first pilot signal $S_{Pilot1}$; a second pilot output 34 of said control device produces a second pilot signal $S_{Pilot2}$. The first pilot signal $S_{Pilot1}$ is preferably a harmonic signal, namely in particular a square-wave signal. The first pilot signal $S_{Pilot1}$ may have a predetermined fundamental frequency which lies, for example, within a range of values from 10 Hz to 1 MHz. The second pilot signal $S_{Pilot2}$ is an identical signal and phase-shifted through 90° with respect to the first pilot signal $S_{Pilot1}$.

Thus the second pilot signal $S_{Pilot2}$ is also a square-wave signal. By way of example, the two pilot signals $S_{Pilot1}$, $S_{Pilot2}$ can be produced using a small oscillator in the control device 5.

The test means 32 comprise an up-converter 35 which is designed for single-sideband modulation and is therefore a single-sideband mixer. A first input 36 of the up-converter 35 is coupled to the first pilot output 32, while a second input 37 of the up-converter 35 is coupled to the second pilot output 34. The up-converter 35 up-converts the two pilot signals $S_{Pilot1}$, $S_{Pilot2}$ and overloads them, namely to form the local check signal $S_P$. The radio-frequency local check signal $S_P$ has such a fundamental frequency as corresponds to the mean frequency of the transmission signals from the radar appliance 3, 4. The local check signal $S_P$ is—as already explained—coupled into the first and second reception paths 16, 21 symmetrically. To this end, the test means 32 comprise a symmetric power splitter 38 which splits the local check signal $S_P$. In this case, the power in the check signal $S_P$ is halved. The check signal $S_P$ is coupled into the reception path 16, 21 using a directional coupler 39, 40. The directional couplers 39, 40 are of the same design.

The local oscillator 26 is an oscillator which is shared by the down-converters 17, 23 and by the up-converter 35. It is actuated by the control device 5. By way of example, the oscillator 26 is a voltage controlled oscillator (voltage control oscillator) which produces the oscillator signal 27 at such a frequency as is dependent on the amplitude of a DC voltage provided on the oscillator 26 by the control device 5.

A portion of the power in the oscillator signal 27 is coupled out for the up-converter 35, namely using a directional coupler 41, for example. This tapped-off oscillator signal 27 is used to feed the up-converter 35, specifically at the LO input 42 thereof. This portion of the power from the oscillator signal 27 that is coupled out for the up-converter 35 is preferably a very small portion, namely −20 dBm, for example. An additional amplifier for the LO input 42, and also for that oscillator signal 27 which is fed to the down-converters 17, 23, is unnecessary. The reason is that the pilot signals $S_{Pilot1}$, $S_{Pilot2}$ are produced at a correspondingly higher power.

Thus, the local check signal $S_P$ is coupled firstly into the first reception path 16 and secondly into the second reception path 21. The check signal $S_P$ is therefore down-converted, namely to baseband, firstly by the first down-converter 17 and secondly by the second down-converter 23. In this case, the first down-converter 17 outputs a first test signal $S_{T1}$ from the check signal $S_P$, while the second down-converter 23 outputs the second test signal $S_{T2}$. The test signals $S_{T1}$, $S_{T2}$ are received via the control device 5, namely at the respective channel inputs 20, 25.

As already explained, the radar appliance 3, 4 changes to the test mode, specifically before each measurement cycle or before the initiation of each operating mode. In this test mode, the control device 5 initially checks the reception paths 16, 21 for their operational status. To this end, the control device 5 produces the pilot signals $S_{Pilot1}$, $S_{Pilot2}$ and checks whether or not the test signals $S_{T1}$, $S_{T2}$ are applied to the respective channel inputs 20, 25. If the test signals $S_{T1}$, $S_{T2}$ can be detected by the control device 5, the two reception paths 16, 21 and also the down-converters 17, 23 are operational.

It should be noted at this point that the check signal $S_P$ is a signal which is separate from or independent of a transmission signal from the radar appliance.

On the basis of the test signals $S_{T1}$, $S_{T2}$, the control device 5 also ascertains a correction variable for correcting the measured variables. Specifically, the control device 5 can calculate a phase difference between the phase of the first test signal $S_{T1}$ and the phase of the second test signal $S_{T2}$ as a correction variable. This phase difference is then used by the control device 5 to correct the measured variables, particularly the target angle $\alpha_1$, $\alpha_2$. This is because the phase difference reproduces the differences in the propagation and phase properties of the two reception paths 16, 21 and of the down-converters 17, 23, of the baseband amplifiers 101, 102 and possibly of further components of the receiver 13. Hence, it is possible to take account of any imprecisions or deviations from a setpoint measurement which are present when determining the measured variables.

Instead of producing the pilot signals $S_{Pilot1}$, $S_{Pilot2}$ and hence the local check signal $S_P$ in a test mode of the radar appliance 3, 4, same signals $S_{Pilot1}$, $S_{Pilot2}$ $S_P$ can also be produced constantly by the control device 5, namely during the operation of the radar appliance 3, 4. In that case, a frequency component which corresponds to the pilot signal $S_{Pilot1}$, $S_{Pilot2}$ is obtained continually in the respective baseband signals $S_{B1}$, $S_{B2}$. Since this frequency is known, it can then be rejected by the control device 5—for example by a notch filter.

The pilot signals $S_{Pilot1}$, $S_{Pilot2}$ are square-wave signals in the exemplary embodiment. These pilot signals $S_{Pilot1}$, $S_{Pilot2}$ are routed to the up-converter 35, which then provides the radio-frequency local check signal $S_P$. The check signal $S_P$ is down-converted into the two reception channels by the down-converter 17, 23 and amplified by the baseband amplifiers 101, 102.

Figure 6:
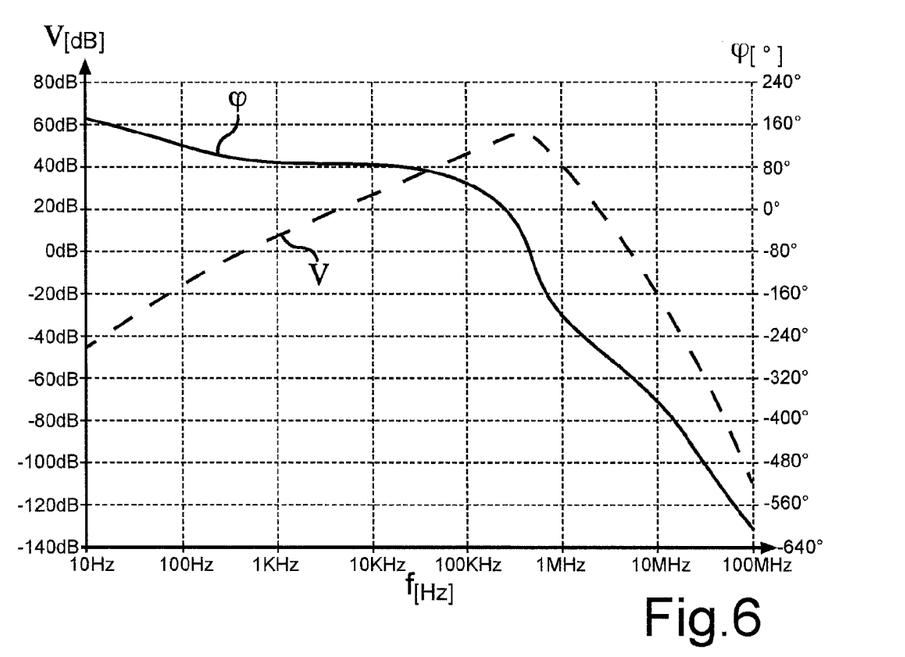
FIG. 6 shows a frequency-dependent gain characteristic and also a phase characteristic for a baseband amplifier of the radio appliance.

In the present case, interest is directed at determining the target angle or angle of azimuth $\alpha$ on the basis of the phase difference between the phases of the received signals $S_{E1}$, $S_{E2}$. As already stated, the control device 5 determines a correction variable for correcting the target angle $\alpha$; the correction variable is the phase difference between the phase shift in the first reception channel and the phase shift in the second reception channel. This phase difference is essentially caused by the down-converters 17, 23 and by the baseband amplifiers 101, 102. While the down-converters 17, 23 have essentially constant phase properties over the frequency range of the baseband and hence there are also no expected fluctuations in the phase difference over the entire baseband, the baseband amplifiers 101, 102 cause a phase error that is dependent on the frequency in the baseband. The baseband amplifiers 101, 102 therefore cause a phase shift between the phases of the received signals $S_{E1}$, $S_{E2}$ that is dependent on the frequency. The frequency-dependent phase shift can be attributed to the gain characteristic of the baseband amplifier 101, 102. FIG. 6 shows firstly a gain characteristic V and secondly a phase characteristic φ for the baseband amplifier 101, 102, in each case as a function of the frequency f. As is evident from FIG. 6, a gain characteristic V has been chosen that rises by 20 dB per frequency decade (in the case of logarithmic refinement). Hence, the decreasing power of the received signals $S_{E1}$, $S_{E2}$ as the distance of the object increases is compensated for. As is also evident from FIG. 6, the baseband amplifiers 101, 102 cause a frequency-dependent phase shift in the amplified baseband signals $S_{B1}$, $S_{B2}$.

Figure 7:
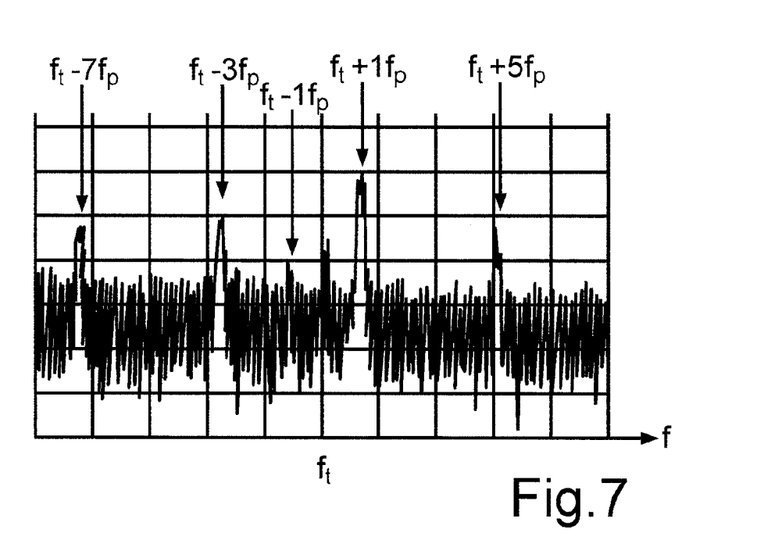
FIG. 7 shows the frequency spectrum of a check signal as produced by test means in the radar appliance and coupled into reception paths of the radar appliance.

For this reason, the control device 5 determines the correction variable for correcting the target angle $\alpha_1$, $\alpha_2$ as a frequency-dependent correction variable. Specifically, a frequency-dependent phase difference δ(f) is determined as a correction variable. This phase difference δ(f) reproduces the frequency-dependent difference between the phase shift in the first reception channel and the phase shift in the second reception channel. For determining the frequency-dependent phase difference δ(f), the square-wave shape of the pilot signals $S_{Pilot1}$, $S_{Pilot2}$ is found to be particularly advantageous. The reason is that in that case the check signal $S_P$ has a plurality of frequency components or harmonics that occur besides the fundamental frequency. Besides the fundamental frequency, uneven integer multiples of the fundamental frequency thus also occur. An exemplary frequency spectrum for the check signal $S_P$ is shown in FIG. 7. The carrier frequency of the check signal $S_P$ is denoted by ft in FIG. 7. Besides the carrier frequency ft, further frequency components or sidebands can also be seen. Since the two pilot signals $S_{Pilot1}$, $S_{Pilot2}$ have a phase shift of 90° in relation to one another, the harmonics (2n−1)·ft of these pilot signals $S_{Pilot1}$ and $S_{Pilot2}$ likewise always have a phase difference of (2n−1)·90°. Hence, the harmonics also have a phase difference of +/−90°, and appropriate sideband suppression, which is necessary for phase calibration, continues to be ensured, namely on account of the single sideband modulation. As is evident from FIG. 7, the lower (left) and the upper (right) sideband—starting from the carrier frequency ft—are suppressed alternately as the index n rises.

To determine the frequency-dependent phase difference (δ(f)), the control device 5 then does not just evaluate the test signals $S_{T1}$, $S_{T2}$ at the fundamental frequency; harmonics of these test signals $S_{T1}$, $S_{T2}$ are also evaluated. By evaluating the harmonics, frequency-dependent calibration of the phase difference between the two reception channels is performed and it is also possible to calibrate phase inequalities between the two baseband amplifiers 101, 102 at the harmonic frequency points. The correction variable (δ(f)) is therefore determined not just for the fundamental frequency but also for the (at least uneven) integer multiples of the fundamental frequency, that is to say for the harmonics of the test signals $S_{T1}$, $S_{T2}$.

Figure 4:
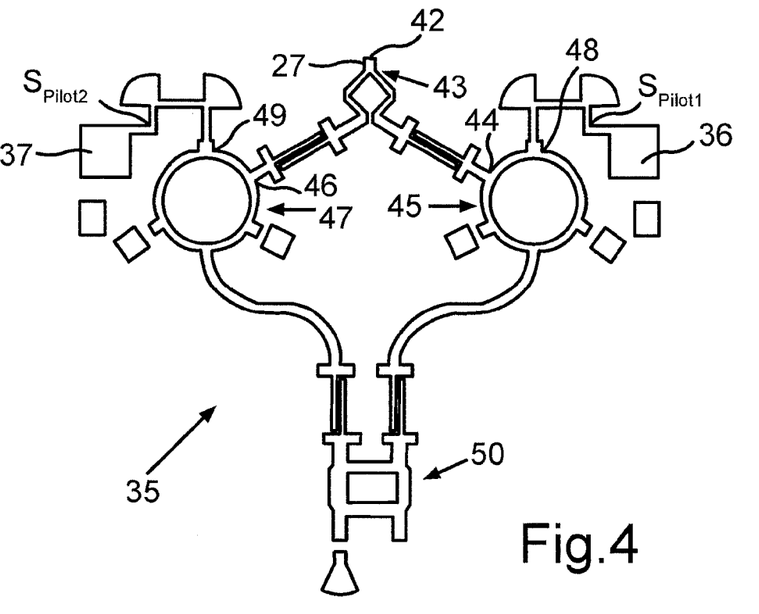
FIG. 4 shows a schematic illustration of a general arrangement plan (RF-Layout) of an up-converter in the radar appliance.

FIG. 4 shows a schematic illustration of a general arrangement (RF layout) of the up-converter 35 using microstrip technology. The up-converter 35 is what is known as a rat race mixer with diodes (not shown). The LO input 42 has the oscillator signal 27 applied to it. The oscillator signal 27 is halved using a power splitter 43 and propagates firstly toward a first port 44 of a first annular coupler 45 and secondly toward a first port 46 of a second annular coupler 47. From the first input 36 of the up-converter 35, the first pilot signal $S_{Pilot1}$ propagates toward a second port 48 of the coupler 45. Correspondingly, the second pilot signal $S_{Pilot2}$ propagates from the second input 37 toward a second port 49 of the second coupler 47. The first pilot signal $S_{Pilot1}$ and the oscillator signal 27, on the one hand, and the second pilot signal $S_{Pilot2}$ and the oscillator signal 27, on the other hand, overlap and the respective superpositions propagate toward a 90° hybrid coupler 50. There, these superpositions overlap, as a result of which the local check signal $S_P$ is output.

Figure 5:
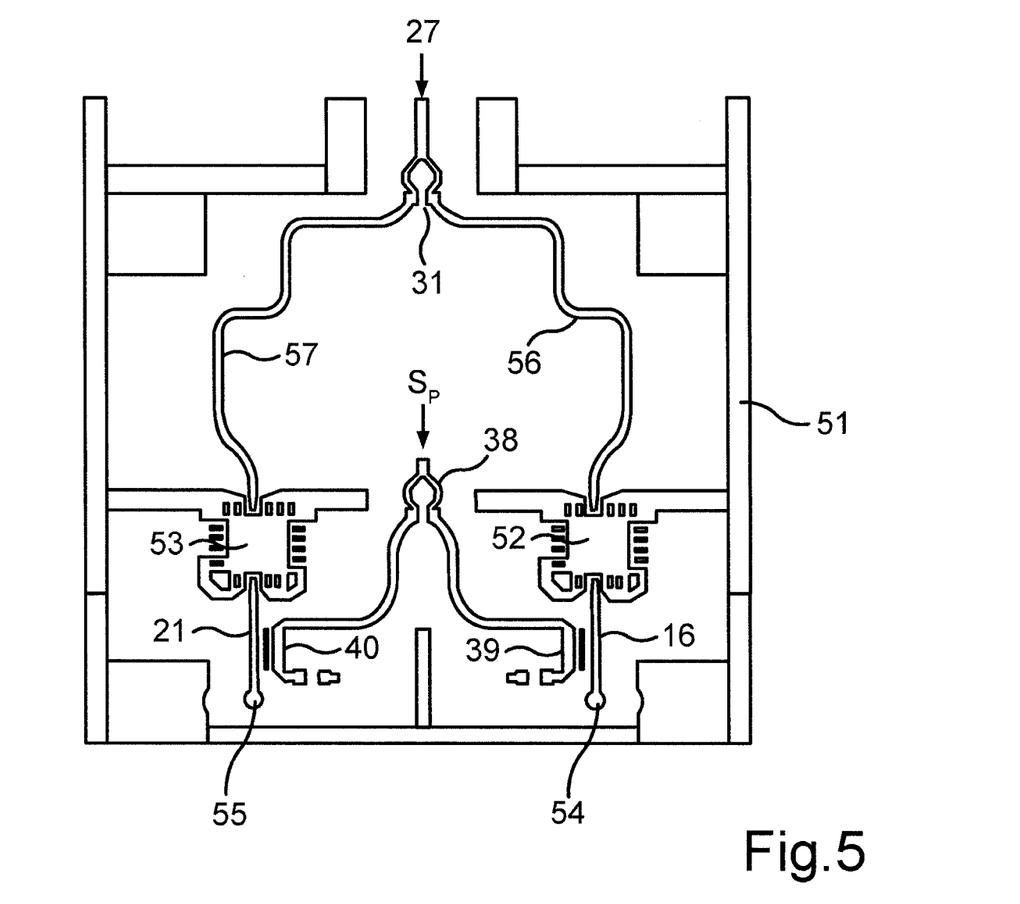
FIG. 5 shows a schematic illustration of a general arrangement plan (RF-Layout) of the radar appliance.

FIG. 5 likewise shows a schematic illustration of the general arrangement (RF layout) of the receiver 13. A ground plane is denoted by 51 in FIG. 5. Two mounting areas 52, 53 are provided on which the first down-converter 17 and the second down-converter 23 are mounted. Furthermore, FIG. 5 reveals respective microstriplines which form the first and second reception paths 16, 21. These lines are firstly coupled to connections 54, 55 for the reception antennas 14, 15 and are secondly routed to the mounting areas 52, 53 so as to be connected to the respective down-converters 17, 23 at those points. The local check signal $S_P$ is coupled into the reception paths 16, 21 via the power splitter 38 using microstrip technology and via the respective directional couplers 39, 40. The power splitter 31 is also provided using microstrip technology and is coupled firstly to the first down-converter 17 via a microstripline 56 and to the second down-converter 23 via a further microstripline 57.

The directional couplers 39, 40 are of identical design. The power splitter 38 is a symmetric power splitter, which means that the power of the local check signal $S_P$ is halved.

The invention claimed is:

1. A driver assistance device for a vehicle, comprising:
a radar appliance for determining at least one measured variable referenced to an object that is external to the vehicle, wherein the radar appliance comprises:
at least a first and a second reception antenna, each for receiving signals,
a first down-converter, which is coupled to the first reception antenna via a first reception path, and a second down-converter, which is coupled to the second reception antenna via a second reception path, each for down-converting the received signals into respective baseband signals,
a control device for receiving the baseband signals and for determining the at least one measured variable using the baseband signals, and
test means for producing a local check signal and for coupling same check signal firstly into the first reception path and secondly into the second reception path, as a result of which the control device receives firstly the check signal that has been down-converted by the first down-converter as a first test signal and secondly the check signal that has been down-converted by the second down-converter as a second test signal,
wherein the control device is configured to:
use the test signals to determine a correction variable for correcting the measured variable,
use the test signals to determine the correction variable as a frequency-dependent variable, and
output to the test means a first pilot signal and a second pilot signal that has a 90° phase shift in relation to the first pilot signal, wherein the test means is configured to use the first and second pilot signals to produce the check signal.

2. The driver assistance device as claimed in claim 1, wherein the frequency-dependent correction variable is a phase difference between a phase of the first test signal and a phase of the second test signal.

3. The driver assistance device as claimed in claim 1, wherein the measured variable is a target angle that is an angle between a reference line running through the radar appliance and a connecting line that runs through the radar appliance and the object.

4. The driver assistance device as claimed in claim 1, wherein the control device is designed to determine the frequency-dependent correction variable by evaluating the test signals for integer multiples of a fundamental frequency of the test signals.

5. The driver assistance device as claimed in claim 1, wherein the test signal has been subjected to single sideband modulation.

6. The driver assistance device as claimed in claim 1, wherein the pilot signals are square-wave signals.

7. The driver assistance device as claimed in claim 1, wherein the radar appliance comprises a first baseband amplifier coupled to the first down-converter and a second baseband amplifier coupled to the second down-converter for amplifying the baseband signals wherein the baseband amplifiers have a frequency-dependent gain characteristic that rises by a gradient factor per frequency decade that is in a range of values from 17 dB to 20 dB.

8. The driver assistance device as claimed in claim 1, wherein the test means have an up-converter for producing the local check signal, the output of said up-converter being coupled firstly to the first reception path and secondly to the second reception path.

9. The driver assistance device as claimed in claim 8, wherein the radar appliance has a local oscillator for providing an oscillator signal, said local oscillator being shared by the first and second down-converters and by the up-converter.

10. The driver assistance device as claimed in claim 9, wherein the local oscillator is coupled to an input of the up-converter via a directional coupler or a power splitter, wherein the directional coupler or the power splitter is designed to tap off a portion of between −25 dB and −15 dB from a power of the oscillator signal for the up-converter.

11. The driver assistance device as claimed in claim 1, wherein the control device is designed to use firstly the first test signal and secondly the second test signal to check the first reception path and the second reception path for its operational status.

12. The driver assistance device as claimed in claim 1, wherein the check signal can be produced in a test mode of the radar appliance, in which the radar appliance does not send any transmission signals for determining the measured variable.

13. A method for operating a radar appliance in a motor vehicle, wherein the radar appliance determines at least one measured variable referenced to an object that is external to the vehicle, the method comprising:
   receiving signals by at least a first and a second reception antenna;
   down-converting the received signals into respective baseband signals firstly by a first down-converter, which is coupled to the first reception antenna via a first reception path, and secondly by a second down-converter, which is coupled to the second reception antenna via a second reception path;
   receiving the baseband signals and determining the at least one measured variable using the baseband signals by a control device;
   producing and coupling a local check signal into the first reception path and into the second reception path, as a result of which the control device receives firstly the check signal that has been down-converted by the first down-converter as a first test signal and secondly the check signal that has been down-converted by the second down-converter as a second test signal;
   determining, by the control device, a correction variable for correcting the measured variable using the test signals as a frequency dependent variable; and
   outputting, by the control device, a first pilot signal and a second pilot signal that has a 90° phase shift in relation to the first pilot signal, wherein the first and second pilot signals are used to produce the check signal.

* * * * *